United States Patent [19]

Dorrough et al.

[11] Patent Number: 5,216,492
[45] Date of Patent: Jun. 1, 1993

[54] DYNAMIC VIDEO LUMINANCE AND CHROMINANCE METER

[75] Inventors: Michael L. Dorrough, Woodland Hills; Kenneth S. Gold, Bell Canyon; H. Maurice France, Jr., Palos Verdes Estates, all of Calif.

[73] Assignee: Dorrough Electronics, Woodland Hills, Calif.

[21] Appl. No.: 822,741

[22] Filed: Jan. 21, 1992

[51] Int. Cl.⁵ .............................................. H04N 17/00
[52] U.S. Cl. ...................................... 358/10; 358/139
[58] Field of Search ................. 358/10, 139, 27, 28, 358/29, 185

[56] References Cited

U.S. PATENT DOCUMENTS

| | | |
|---|---|---|
| 4,101,928 | 7/1978 | Sato et al. ............................ 358/10 X |
| 4,758,877 | 7/1988 | Slavin ..................................... 358/10 |
| 4,823,184 | 4/1989 | Belmares-Sarabia et al. ........ 358/27 |
| 4,951,134 | 8/1990 | Nakasima et al. .................. 358/28 X |
| 4,953,017 | 8/1990 | Ivey ..................................... 358/10 X |

Primary Examiner—Victor R. Kostak
Attorney, Agent, or Firm—J. E. McTaggart

[57] ABSTRACT

For monitoring, metering and dynamically displaying key static and dynamic parameters of composite video signals and visually indicating compliance status relative to important system specifications, this electronic meter is particularly useful in connection with video cameras. In studio environments, the compliance indications supplement existing capabilities, and in remote locations where large, complex and costly CRT type waveform monitors are not feasible, the compactness of this video meter provides an unusual degree of picture quality assurance. A bar/graph type LED display provides two independent scale regions: a sync region dynamically displaying sync amplitude, and a picture region dynamically displaying average picture levels in a bar mode and peak levels in a dot mode. The response times of the sync, average and peak level are selectable. Peak indications are lengthened to a display time which is optimal for human response to short term events. A monochrome video meter embodiment displays average luminance levels in a bar mode and peak luminance levels in a dot mode. Presence/absence of sync is indicated by a bi-color LED. Additional parameter status may be indicated by a panel-mounted bi-color LED which provides four indication modes. For color video, a chrominance embodiment, used along with the monochrome embodiment and similarly packaged, displays color burst amplitude and average chrominance in a bar mode, peak chrominance in a dot mode, and optionally monitors color burst phase relative to horizontal sync.

20 Claims, 7 Drawing Sheets

DYNAMIC VIDEO LUMINANCE AND CHROMINANCE METER

FIELD OF THE INVENTION

This invention is in the field of video electronics and, more particularly, instrumentation for continuously monitoring and visually displaying designated luminance and chrominance parameters, signal integrity, and specification compliance status of a composite video signal, particularly as generated from a video camera in a studio or remote setting.

BACKGROUND OF THE INVENTION

The inadequacies of mechanical analog type meters, particularly with regard to indication of instantaneous peak audio level values as displayed on conventional VU meters, are discussed as background to U.S. Pat. No. 4,528,501, DUAL LOUDNESS METER AND METHOD, to Dorrough et al., which discloses an audio level monitoring and metering instrument including a relatively fast changing peak amplitude dot/bar graph type LED display and associated processing circuitry, which effectively simulates the display function of a mechanical analog meter but which overcomes the inherent ballistic limitations of mechanical meters, providing a graphic display of increased validity and utility.

In video monitoring and display there are a number of additional requirements beyond those of audio. There are a number of video parameters of interest, relating to geometric waveform relationships according to the specifications of a particular video format such as NTSC, which are inherently quasi-static in nature and, in an ideal system, would remain constant in the absence of drift, operator error, or malfunctions introducing anomalous parameter variances. Display of such parameters typically does not require fast response in the display device and thus may be performed adequately by a variety of well known amplitude display media such as switched alphanumeric LED or LCD panels or even mechanical analog meters. Those of the video parameters which are dynamic and thus impose special requirements on the speed of the display for monitoring fluctuating peak and average levels, somewhat comparable to monitoring of audio levels, relate particularly to rapidly changing instantaneous shifts of luminance and chrominance levels, for example peak excursions of the luminance level in both directions, i.e. toward white and toward black. Average picture signal levels are also of interest, and change rapidly. Due to the much higher frequency range of video, in the MHz region compared to the KHz audio region, the required display response speed is well beyond the capability of mechanical analog meters or alphanumeric readouts; these parameters are most often viewed on high speed waveform monitors, typically CRT oscilloscopes. Such video waveform monitors are usually fitted with suitable graticules to additionally enable measurement and monitoring of the abovementioned slow-changing static parameters, and may eliminate the need for separate meters. However, sufficiently accurate waveform monitors are bulky and expensive, due to the special requirements such as display linearity, high stability and wide bandwidth. Furthermore, their calibration procedures tend to be complex and the indirect manner of data presentation generally requires interpretation by trained technical operators. For these reasons, the use of waveform monitors has been generally limited to larger production locations such as professional studios, broadcast stations and laboratories.

The present invention addresses an unfulfilled need for new monitoring and display techniques and related apparatus which is less bulky, less costly and easy to operate by unskilled personnel, and thus more suited for use with portable video cameras than such apparatus of known art.

PRIOR ART

U.S. Pat. No. 4,679,042 to Tretheway and U.S. Pat. No. 4,688,029 to Kawasaki et al. are of interest in the showing of visual indicators with light emitting elements. To display more than one set of input data simultaneously, Trethewey's bar/dot level meter utilizes an interdigitated grand linear array of light emitting elements; Kawasaki's analog display device utilizes alternately arranged elements of different color.

U.S. Pat. No. 4,504,851 to Janko et al for a SYSTEM FOR MONITORING VIDEO SIGNAL PARAMETERS, INCLUDING THE LUMINANCE SIGNAL, addresses comprehensive monitoring and analysis of video waveforms utilizing a multi-position selector switch to select amongst numerous parameters for analog-to-digital conversion and digital comparison with stored reference values; a bar graph display is shown, however preference is expressed for indicating comparison results as outputs in the form of a numeric percentages on a digital display.

OBJECTS OF THE INVENTION

It is a primary object of the present invention to provide metering and monitoring apparatus for visual display of key static and dynamic parameters of composite video signals.

It is a further object to provide the visual display in a simulated analog meter format utilizing solid state electro-optic media.

It is a further object to provide, economical, compact and convenient apparatus for monitoring signals from video cameras, including an ongoing dynamic incremental display of average and peak picture signal levels and sync signal level simultaneously along a scale marked in standard units.

It is a still further object to provide in the dynamic video signal peak level indications the capabilities of selecting more than one meter response time, including a lengthening of the display time to allow human response to short term events.

It is a further object to provide an embodiment of such apparatus directed to monochrome video signals and adapted to indicate average and peak luminance signal levels and line sync pulse level.

It is a further object to provide an embodiment of such apparatus directed to color video signals and adapted to indicate average and peak chrominance signal levels and color burst level.

It is a further object to provide, in the video monitoring apparatus automatic, indication of the integrity of the composite video signal, for example the presence or absence of line and color sync, i.e sync pulses and color burst, each indicated separately.

It is a still further object to provide, in the video monitoring apparatus, distinctive automatic indication of the status and ongoing conformity of various parameters monitored relative to specified limits, such as the extremes of luminance and/or chroma levels, line sync pulse level, setup level, color burst amplitude and burst phase relative to line sync.

SUMMARY OF THE INVENTION

The above objects have been met in the present invention of video monitoring, metering and display apparatus utilizing a bar/graph type LED display having two independent scale portions, a first portion displaying sync amplitude and a second portion, displaying average picture signal levels in a bar mode and peak levels in a dot mode. A basic embodiment monitors, measures and displays key monochrome parameters of video signal. A color embodiment, which may be used in conjunction with the basic embodiment, monitors, measures and displays key color parameters of video signals on a similar display.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
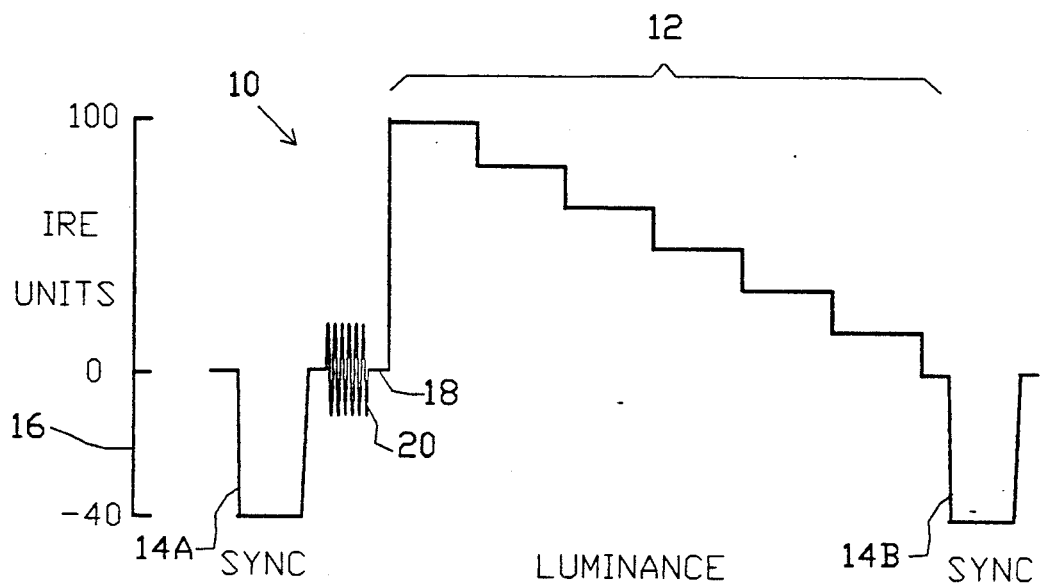
FIG. 1 shows a standard composite video test waveform.

FIG. 1 shows a standard NTSC composite video test waveform 10 with a staircase luminance portion 12 of one line duration between horizontal sync pulses 14A and 14B. The present invention is directed to providing a display indicating, in IRE units according to scale 16, at least three key level parameters of the video signal, e.g. the sync level, the peak luminance (white) level and the average luminance level, each referenced by d.c. restoration to 0 IRE units which corresponds to the level of the "back porch" 18. The color burst 20 shown is present in the case of color video, but absent in the case of monochrome.

Figure 2:
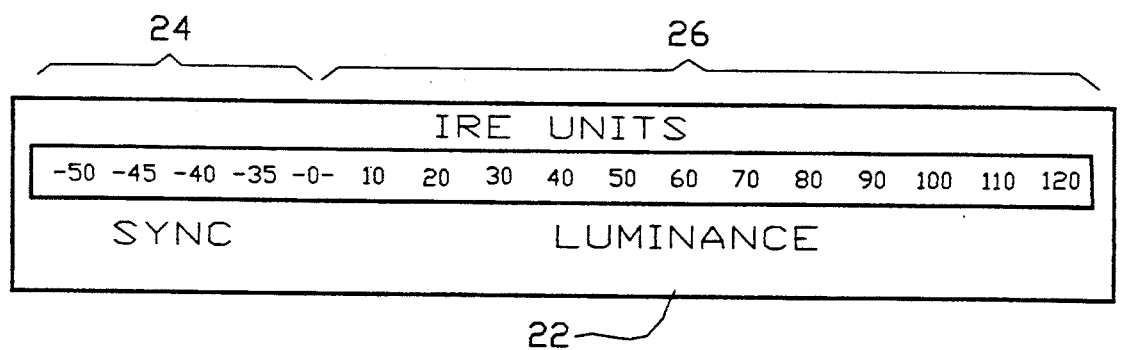
FIG. 2 shows a linear scale for displaying luminance and sync level indications of a video waveform such as that of FIG. 1.

FIG. 2 shows a representation of an inline display scale 22 in which the sync level is to be displayed on the left hand portion 24 in an expanded range marked −50 to −30 IRE units, while the average and peak luminance levels are to be displayed on the right hand portion 26, marked 0 to 120 IRE units. These ranges allow for indications of abnormal levels beyond the nominal sync level (−40) and full luminance (100).

Alternatively, the sync could be indicated on a non-expanded range, e.g. 0 to −50 IRE units, however the expanded range is considered generally preferable.

In a preferred display embodiment the scale may be made to form an arc so as to simulate the scale of an analog meter, as an alternative to the inline horizontal scale shown in FIG. 2. As another alternative, the scale could be oriented vertically (as in FIG. 4).

Figure 3:
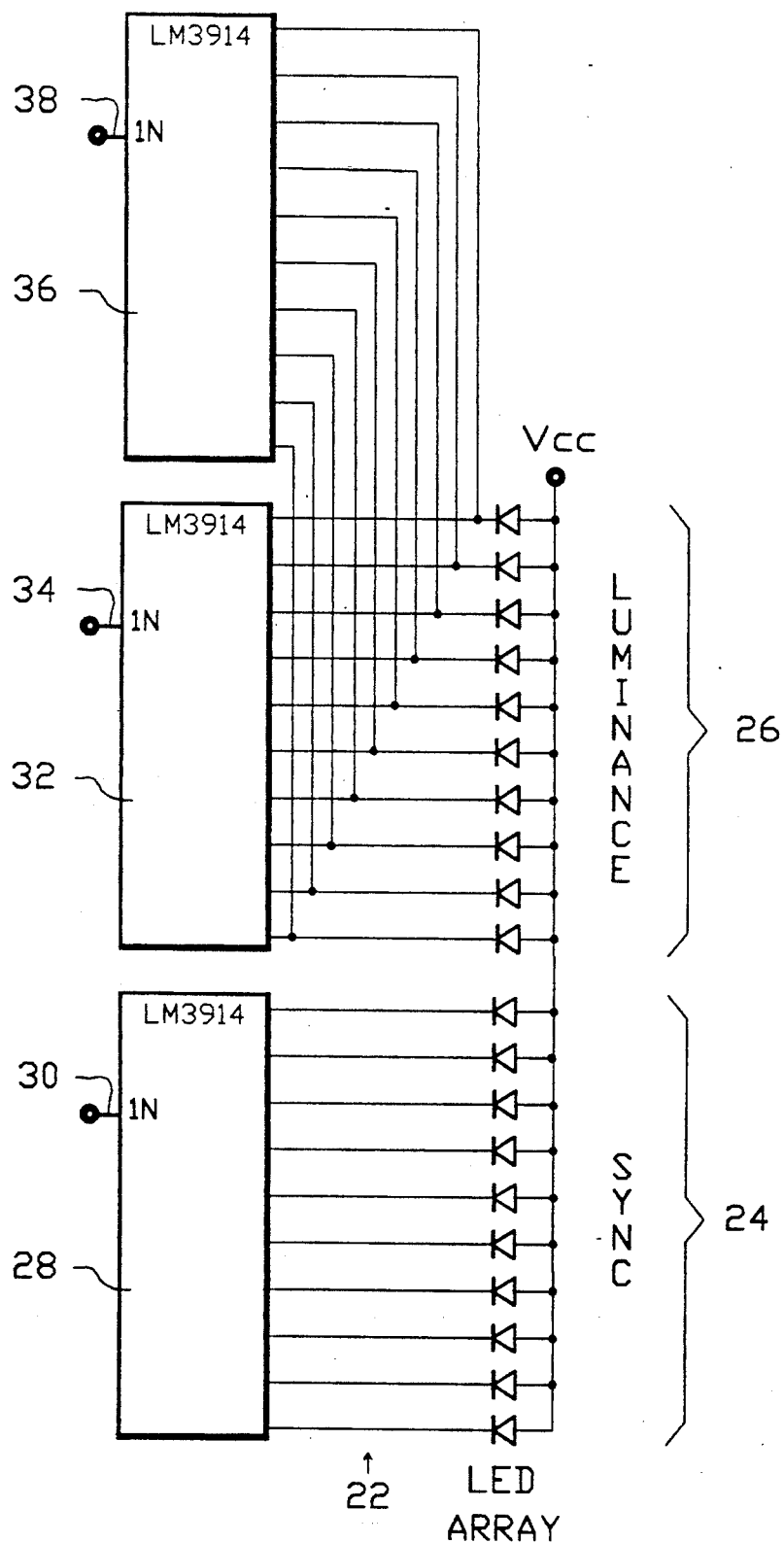
FIG. 3 is a wiring diagram of a display system for implementing a display having a scale such as that of FIG. 2 in accordance with this invention.

FIG. 3 is a wiring diagram of an implementation of the display scale 22 of FIG. 2 utilizing LED's (light emitting diodes) in a dot/bar graph type linear display array 27 having two colinear portions. The sync portion 24 is driven by an IC driver 28, receiving a sync signal at input node 29, which may be preset to operate in either a dot or bar display mode, covering the designated range of IRE units with a designated number of LEDs. The luminance portion 26 is driven by drivers 30 and 32; driver 30 receives an input signal at node 31 representing average luminance, and driver 32 receives an input signal at node 33 representing peak luminance. Since each output terminal of these drivers is connected internally to the collector of an NPN transistor, the outputs of the two drivers 30 and 32 may be connected in parallel as shown to function as OR gates with respect to each LED in the luminance portion 26 of the display unit 22. Driver 30 is preset to drive the LED display in a bar mode for average indication while driver 32 is preset to drive the display in a dot mode for peak indication.

In a preferred embodiment, different colored LED's are utilized to distinguish different parameters and levels of operation: e.g. green for luminance levels within a normal operating range (e.g. 0 to 93 IRE units), red for luminance levels exceeding normal (i.e. saturation), and amber for sync level indication.

Figure 4:
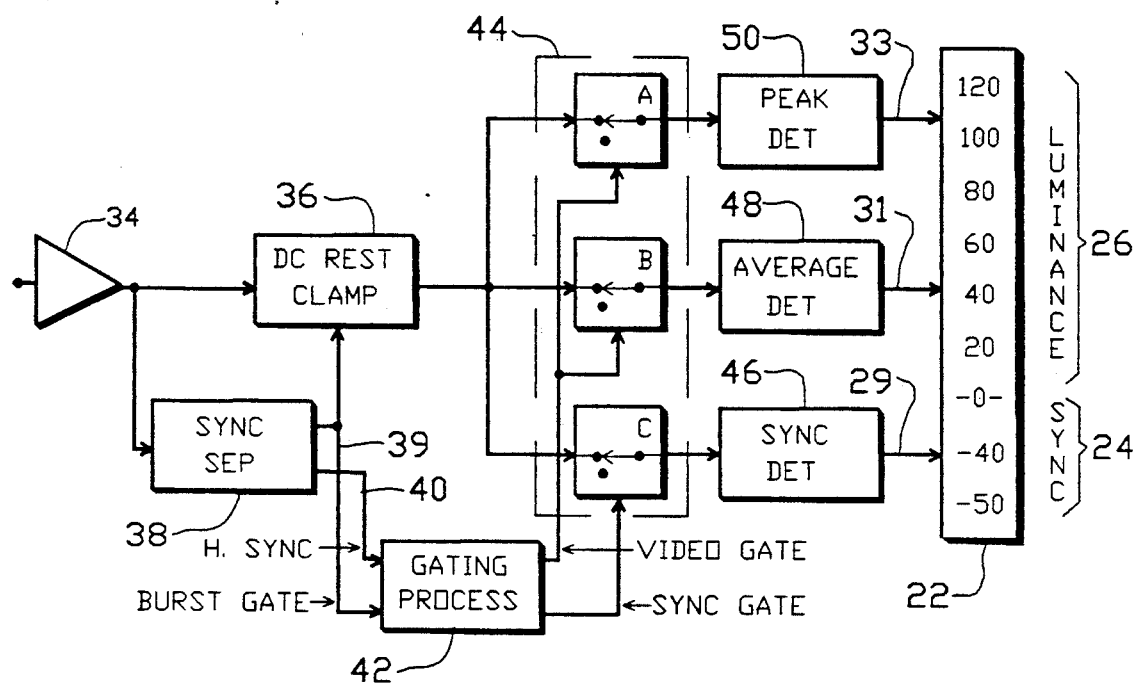
FIG. 4 is a block diagram of a video signal processing system for providing composite video average and peak luminance and line sync indication on the display system of FIG. 3 in accordance with this invention.

FIG. 4 is a simplified functional block diagram of an embodiment of this invention including electronic circuitry for processing a monochrome video signal as in FIG. 1 to drive a visual display as in FIG. 2. A video buffer amplifier 34 receiving an incoming composite video signal, applies the video signal to a d.c. restoration clamp circuit 36 and to a sync separator circuit 38.

In clamp circuit 36, the burst gate signal is used to clamp the "back porch" of the incoming video signal to ground level so that luminance is positive-going in polarity and sync is negative-going in accordance with the scale of IRE units (refer to FIGS. 1 and 2). Sync separator 38 supplies (a) a burst gate signal at node 39 to clamp circuit 36 and to a gating processor 42, and (b) a separated horizontal sync signal at node 40 to processor 42. A three section electronic switch 44, of the CMOS bilateral analog type, receives, as signal input, composite video from clamp circuit 36, and receives control inputs from processor 42.

At sections A and B of switch 44, a video gate switching control signal from processor 42 acts to condition the video luminance signal by stripping away unwanted information such as sync and VIR (vertical interval reference) signals which could otherwise introduce detection errors by overriding the true luminance component. The resultant conditioned video luminance signals at the output of sections A and B of switch 44 are applied to average detector 48 and peak detector 50 respectively, which detect the amplitude of the positive-going luminance signal and deliver the two detected signals at nodes 31 and 33 to the luminance portion 26 of LED display unit 22.

At section C of switch 44, a conditioned sync signal from processor 42 acts as a switch control signal to condition the sync signal so as to prevent luminance influence even under abnormal conditions. The resultant conditioned sync signal is delivered at node 29 to the sync portion 24 of LED display 22. There the corresponding sync level is displayed in a dot mode, while luminance levels are displayed on the separate luminance portion 24 where the drivers (30 and 32 in FIG. 3) receiving an average signal input at node 31 and a peak signal input at node 33, are preset to display the average level in a bar mode and the peak level in a dot mode. There is no conflict between these two modes acting simultaneously since by definition the peak level dot indication can be expected to always ride above the average level bar indication.

Figure 5:
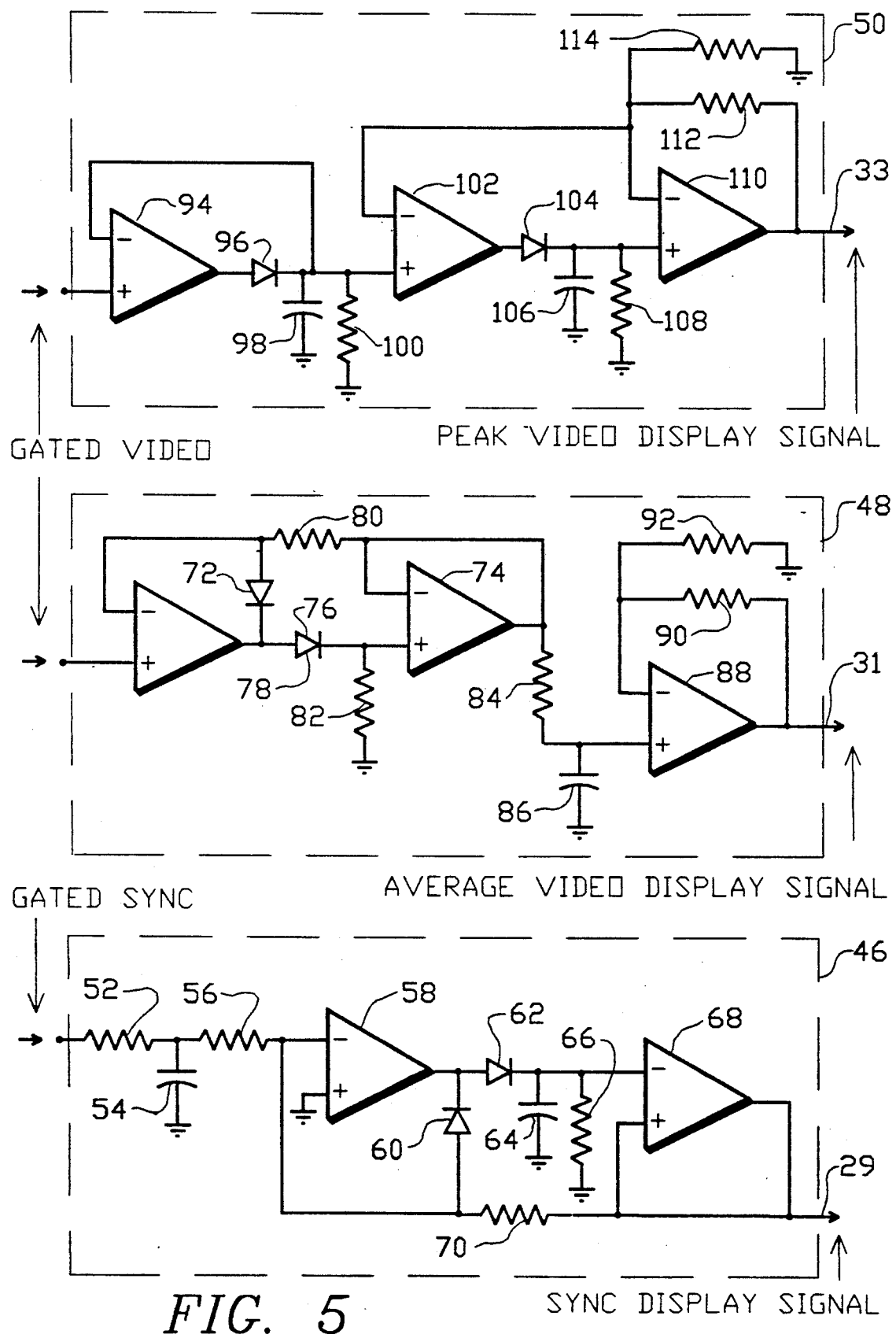
FIG. 5 is a detailed circuit diagram of the three detector circuit blocks of FIG. 4.

FIG. 5 is a detailed circuit diagram of the three detector circuits 46, 48 and 50 of FIG. 4. In detector circuit 46 the input gated sync signal is low-pass filtered by resistor 52 and capacitor 54 and applied via resistor 56 to op-amp 58 which is configured with feedback diode 60, detector diode 62, detector load capacitor 64 and detector load resistor 66 to function as an inverting precision peak detector. The resultant positive-going detected d.c. voltage, representing peak sync amplitude, is delivered to node 29 as a display drive output by op-amp 68, configured as a unity gain buffer, biased through resistor 70. Typical component values are: resistors 52 and R56: 4.64 k; capacitor 64: 0.33 uF; resistors 66 and 70: 1M and 124 k respectively.

In detector circuit 48, which receives as input the positive-going gated video luminance signal, op-amps 72 and 74 are configured with diodes 76 and 78 and resistors 80 and 82 to act as an average detector to develop a positive-going d.c. envelope representing average luminance level which, following low pass filtering by resistor 84 and capacitor 86, is applied to op-amp 88, configured as a buffer amplifier whose gain is set by resistors 90 and 92 in the negative feedback circuit to provide as a display drive output at node 31 a positive fluctuating d.c. voltage representing average luminance. Typical component values are: resistors 80, 82, 84, 90 and 92: 10 k, 1K, 1M, 3.59 k, and 1 k respectively; C86: 0.33 uF.

In detector circuit 50, which also receives as input the positive-going gated video luminance signal, op-amp 94 is configured with feedback diode 96 to act as a detector with load capacitor 98 and load resistor 100, driving op-amp 102. Diode 104, detector load capacitor 106 and detector load resistor 108, along with op-amp 102, provide a further stage of detection with a longer time constant to produce a detected d.c. signal, representing peak luminance amplitude, delivered at node 33 as a display drive output by op-amp 110 configured as a buffer amplifier whose gain is set by resistors 112 and 114 in the negative feedback circuit. Typical component values are: resistors 100 108 112 and 114: 1M, 1M, 2.5 k and 1 k respectively; capacitors 98 and 106: 3300 pF and 0.33 uF respectively.

In each of the detector circuits the rise and fall time characteristics of the corresponding display indication may be optimized with regard to both technical accuracy and subjective acceptability through design selection of the appropriate R and C component values. A selector switch may be provided to allow user selection of rise/fall display speed with regard to any or all of the three parameters displayed: this may be implemented as a two position switch (slow/fast), located on the rear panel.

Figure 6:
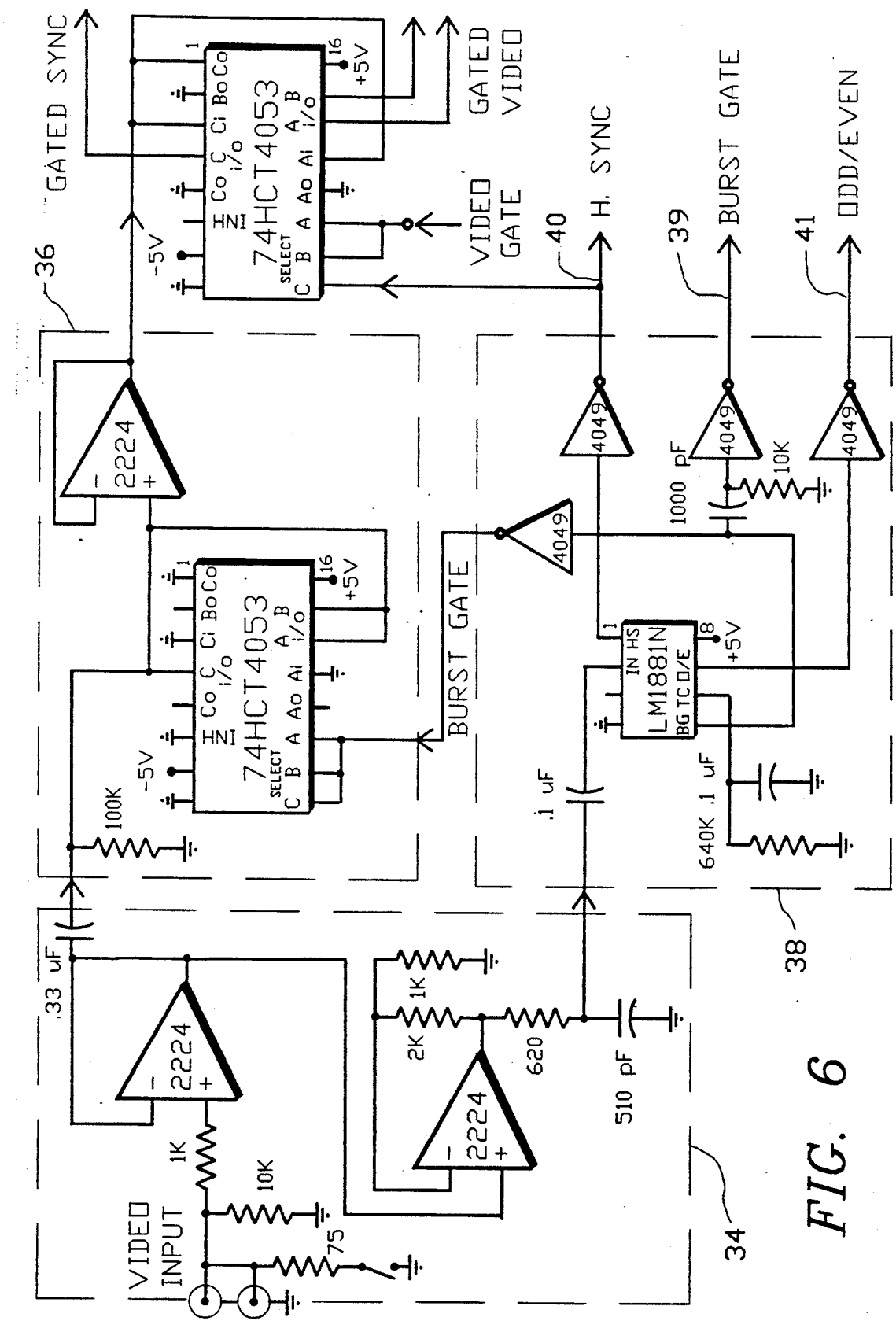
FIG. 6 is a detailed schematic diagram of typical implementation of the input amplifier, d.c. restoration clamp, sync separator and electronic switch circuit blocks shown in FIG. 4.

FIG. 6 is a schematic diagram of typical implementation of the following circuit blocks shown in FIG. 4: input amplifier 34, d.c. restoration clamp 36, sync separator 38 and electronic switch circuit 44. Typical component values are indicated on the drawing.

At the input of amplifier block 34 a pair of coaxial receptacles and a switchable load resistor allow 75 ohm termination or looping through to other equipment. In addition to the separated horizontal sync signal at node 40 and the burst gate signal at node 39, sync separator 38 supplies an O/E (odd/even) interlace status signal at node 41.

Figure 7:
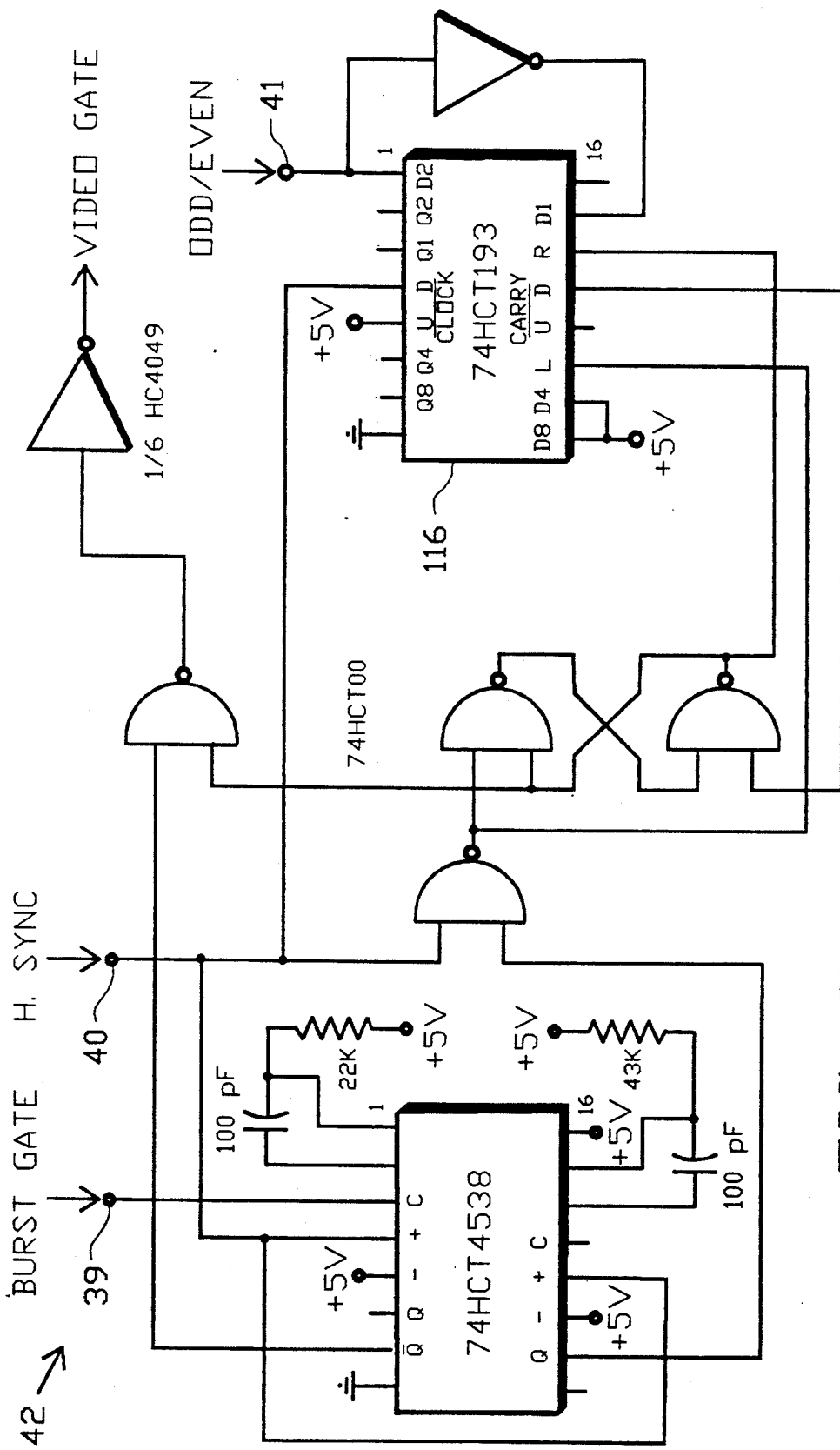
FIG. 7 is a detailed schematic diagram of typical implementation of the gating processor circuit block shown in FIG. 4.

FIG. 7 is a detailed schematic diagram of typical implementation of the gating processor 42 (FIG. 4) including a counter 116 clocked by horizontal pulses and adapted to utilize the O/E signal received at node 41 to extend the video gating period to include a designated number of the initial horizontal lines of odd/even interlaced frames so as to fully exclude VI signals while retaining practically all valid luminance signals in the gated luminance signal which is applied to detectors 48 and 50 of FIGS. 4 and 5.

Figure 8:
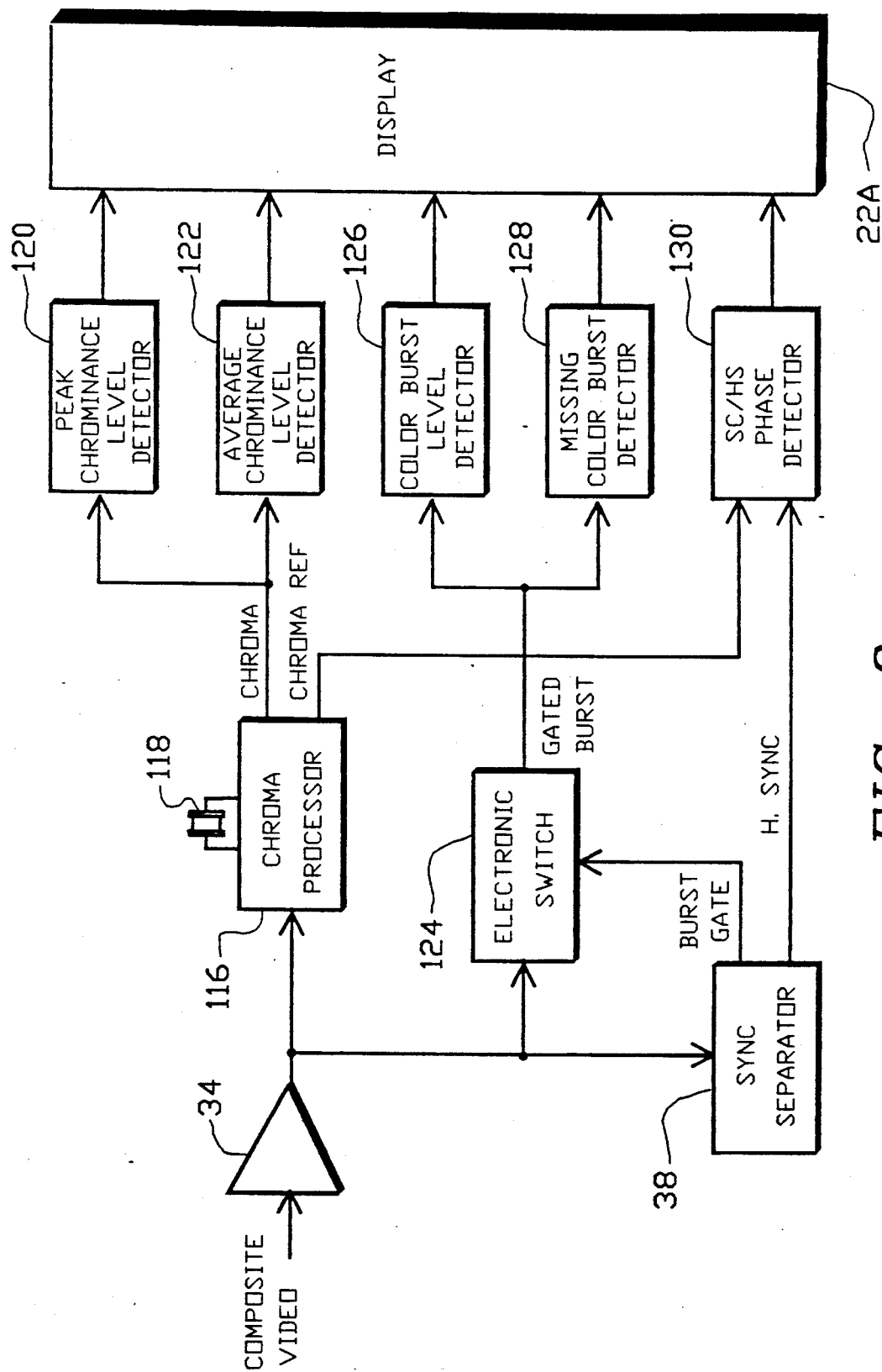
FIG. 8 is a simplified block diagram of circuitry for detecting, monitoring and processing key parameters of color video signals for display on a system as shown in FIG. 3.

FIG. 8 is a simplified block diagram of a color video embodiment of the present invention directed to detecting, monitoring, processing and displaying key parameters of color video signals. A video input buffer amplifier 34 drives a sync separator 38, as in the monochrome embodiment described above. Buffer amplifier 34 also drives a chroma processor 116 which includes a piezoelectric crystal 118 with associated circuitry to provide a continuous chroma reference signal synchronized to the color burst (20, FIG. 1). The chroma processor 116 also provides a chroma envelope signal which is applied to a peak chrominance level detector 120 and an average chrominance level detector 122, which both drive a display unit 22A so as to indicate average and peak chroma levels in dot and bar modes respectively, similar to the luminance indication in the monochrome embodiment. Detectors 120 and 122 are generally similar to detectors 48 and 50 shown in FIG. 5, with response times selected for human response as in the monochrome embodiment; for example the peak detector may be given a response time of 250 milliseconds and the display indication lengthened to allow human response to short term events. Display unit 22A is basically similar to display unit 22 in FIG. 3, with optional peripheral adaptations to accept additional inputs for special display features.

The burst gate signal derived from the color burst in sync separator 38 controls an electronic switch 124 so as to supply a gated color burst signal to a color burst level detector 126. This detected color burst level is supplied to the display 22A, to be indicated in a dot mode, with over-range indicated by flashing all LEDs, in a manner similar to that previously described for the sync level indications in the monochrome embodiment since the color burst may be considered as a synchronizing signal equivalent to horizontal sync pulses.

The gated color burst signal from electronic switch 124 is also applied to a missing color burst detector 128 which is adapted to supply a signal to display 22A for indicating the presence or absence of color burst in the incoming video signal. Loss of color burst is to be indicated by a green/red LED in the same manner as described above for sync dropout in monochrome.

The chroma reference signal from chroma processor 116 and the horizontal sync signal from sync separator 38 are supplied to a phase detector 130 which detects the relative phase angle between the horizontal sync and the color burst and actuates the display unit 22A accordingly. Typically the horizontal sync phase reference is taken at the 50% level of the falling edge, and compared with the color burst zero crossing point. Phase shift up to +/−20 degrees is generally acceptable except for the most sensitive formats such as laser disk. A bi-color green/red LED in display unit 22A may be utilized to indicate phase shift as follows: if the phase shift is less than +/−10 degrees, the green diode of the LED will be illuminated; if the phase shift is more than +/−10 degrees but less than +/−20 degrees, both the green and red diodes will be illuminated providing a yellow indication; and should the phase shift exceed +/−20 degrees, only the red diode of the LED will be illuminated.

In the chrominance processing circuitry, a d.c. restoration clamp (36, FIG. 1) is not required since the chroma signals are a.c. coupled 3.58 MHz symmetrical sinewaves.

The color embodiment as described is intended for use in conjunction with the basic monochrome embodiment as a supplement for providing color parameter capabilities. As an alternative, monochrome and color capabilities could be realized in a single combined embodiment by providing suitable selection and display adaptations according to the principles of this invention.

In a refinement of the color embodiment, display of individual RGB chrominance levels could be made available through the addition of the necessary demodulation, processing and selection circuitry; these could be displayed simultaneously on a triple array of appropriately colored LEDs.

In the monochrome and the color embodiments, circuitry may be provided to energize all of the (yellow) LEDs in the sync portion 24 of display unit 22 (FIGS. 3, 4) to excessive level or overranging. Indication of the presence/absence of line sync pulses or color burst in the incoming signal is an optional refinement; typically this is implemented by means of an LED located in the vicinity of the LED array of display unit 20: in a preferred version, a bi-color LED is made to indicate normal sync by a green indication and missing sync by red indication.

In the above-described monochrome embodiments the LED display is made to indicate peak (maximum) luminance level, i.e. the furthest excursion toward white, in a dot display mode and to indicate average luminance in a bar display mode where the bar rises from a base of 0 IRE units; the signal's minimum luminance level, i.e. the furthest excursion toward black, is not indicated. An alternative embodiment could be made to include minimum luminance level indication: this would require an additional detector circuit and special drive circuitry in the display designed to indicate luminance as a floating (rather than zero-based) bar which indicates the peak (maximum) luminance level in the manner described above at the upscale end, and which additionally indicates the minimum luminance level at the downscale end; the average luminance could be indicated as an interrupted segment (e.g. one LED) within the bar.

"Setup" violation indication may be provided as an option, especially in the basic monochrome embodiment. A black reference level is normally defined at 7.5 IRE units above the baseline level at 0 IRE units; however "blacker than black" levels are sometimes encountered from titlers and graphics devices or improper black level adjustment in a camera. A bi-color LED may be made to indicate non-violation of the setup level (e.g. beyond 6 IRE units) as a green indication, violation between 6 and 0 IRE units as a yellow indication (green+red), and violation below the IRE zero baseline as red.

Typical these "violation" indicators are timed by the associated circuitry to respond to brief violations of less than about 250 microseconds, and to illuminate the LED a minimum of about 250 milliseconds.

In an alternative display implementation, more than one row of LED's may be provided in at least the picture level portion, to enable the simultaneous display of additional parameters.

As an optional extension of the visual indications as described above, the instrument of this invention may be adapted to provide audible indications, for example by incorporating one or more sonic transducers with appropriate driving circuitry.

In another optional extension of the invention, the video waveform could be monitored for movement, for example by detecting variations over time of the average video level, peak levels and/or combinations thereof, so to constitute a motion detector which could be made to provide an alarm. e.g. a sonic alarm as described in the previous paragraph.

Such motion detection and alarm could be utilized to upgrade closed circuit video security systems. For example, in a typical closed circuit video security system as presently practiced, a bank of monitors, each connected to one of a system of cameras deployed throughout the secured area, require continuous visual watch by security personnel. Typically during an overnight watch period the areas monitored are empty and the video images are motionless, yet for full security they must all be watched continuously by a security guard. Whenever there is a distraction by other duties there may be a lapse in the surveillance. With the addition of video meters of this invention, adapted as suggested in the previous two paragraphs, connected to some or all of the cameras, the capability of detecting video motion and consequently activating a sonic (or other) alarm could in many instances allow the guard to attend to other duties without losing continuity of the camera surveillance.

To support external accessories such as alarm devices, special processors, etc., it is envisioned that interfacing capability may be provided, including appropriate buffering and connection means, enclosure-mounted and/or incorporated in the internal circuit board implementation.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An electronic video meter for visually monitoring key parameters of a composite video signal, comprising:

a video input receptacle adapted to receive the composite video signal from a coaxial cable;

electronic processing circuitry, receiving the signal via said receptacle, adapted to detect designated parameters of the video signal including at least average and peak picture level and sync level, and to generate therefrom designated display information;

electronic display driver circuitry receiving the display information from said electronic processing circuitry;

a display panel having a plurality of solid state electro-optic visual elements driven from said display driver circuitry, said panel having an elongated display scale defining two independent regions: a sync region encompassing a minor scale portion extending from a division point to a first end of the scale, and a picture region encompassing a major portion extending from the division point to a second end of the scale opposite the first end;

said processing circuitry, said display driver circuitry and said display panel being adapted to provide visual indication of the sync level on the sync region of the scale, and to provide visual indication of the average picture level along with distinctive indication of the peak picture level on the picture portion of the scale.

2. The video meter as defined in claim 1 further comprising a "sync dropout" indicator disposed in said panel, said processor being further adapted to cause the indicator to signify normal sync level by showing a first color, and to signify loss of sync by showing a second color which is clearly distinguishable from the first color.

3. The video meter as defined in claim 1 wherein said visual elements comprise at least a single row of LEDs, and wherein said driver circuitry comprises a plurality of drivers organized in three banks: a sync bank having a plurality of drivers each connected to a corresponding one of each of the LED's in the sync region of the scale, an average picture bank having a plurality of drivers each connected to a corresponding one of the LEDs in the picture region, and a peak picture bank having a plurality of drivers each connected to a corresponding one of the LEDs in the picture region.

4. The video meter as defined in claim 3 wherein each of the drivers in the peak picture bank is connected to a corresponding one of the LED's which is also connected to a corresponding driver of the average picture bank, each driver in thusly parallel-connected pairs being made capable of actuating the corresponding LED independent of the other of the pair.

5. The video meter as defined in claim 3 wherein said driver circuitry is further adapted, in the sync bank thereof, to drive the LEDs in the sync region of the scale in a dot mode.

6. The video meter as defined in claim 5 wherein said processor and said driver circuitry are further adapted to indicate sync level over-ranging, wherein the sync level exceeds a display scale range limit, by activating all of the LEDs in the sync region simultaneously.

7. The video meter as defined in claim 3 wherein said driver circuitry is further adapted to cause the drivers in the average picture bank to operate corresponding LEDs in a bar mode, and to cause the drivers in the peak picture bank to operate corresponding LEDs in a dot mode.

8. The video meter as defined in claim 7 wherein said processor circuitry and said driver circuitry are further adapted to cause the drivers in the peak picture bank to operate the corresponding LEDs such as to lengthen display indications to allow human response to short time peak events, and such as to ensure indication from all peak events exceeding a designated minimum duration in the order of 250 milliseconds.

9. The video meter as defined in claim 8 further comprising response time selection switch means adapted to enable selection of response time of the visual elements of the display independently with regard to display of one or more of the parameters including sync level, average picture level and peak picture level.

10. The video meter as defined in claim 7 wherein, in the picture region of said display panel those LEDs representing picture levels within a specified normal range corresponding to a portion of full scale are made to have a first color and those LEDs representing picture levels exceeding the normal range up to full scale are made to have second color.

11. The video meter as defined in claim 10 wherein said processing circuitry and said driving circuitry are further adapted to signify an over-range condition, wherein the picture level exceeds full scale, by activating all LEDs of the second color.

12. The video meter as defined in claim 1 wherein the sync level is further defined as sync pulse amplitude and the picture level is further defined as luminance level, said meter being directed to operation from monochrome video signals.

13. The video meter as defined in claim 12 further comprising a "setup" violation indicator such as an LED disposed in said panel, said processor being further adapted to cause the violation indicator to signify black-direction excursions of the luminance level within a first predetermined limit as normal by showing a first color, to signify such excursions beyond the first limit as marginal by showing a second color, and to signify any further excursions beyond a second predetermined limit as excessive by showing a third color.

14. The video meter as defined in claim 1 wherein the sync level is further defined as color burst amplitude and the picture level is further defined as chrominance level, said meter being directed to operation from color video signals.

15. The video meter as defined in claim 14 further comprising a "color phase" indicator such as an LED disposed in said panel, said processor being further adapted to monitor color burst phase as measured in a predesignated manner relative to horizontal sync, and to cause the LED indicator to signify a normal phase condition within a predetermined first phase error limit by showing a first color to signify a marginal phase condition between the first limit and a predetermined second limit by showing a second color and to signify an excessive phase error condition exceeding the second limit by showing a third color.

16. The video meter as defined in claim 1 wherein the elongated display scale of said display panel is made to be arcuate in shape in approximate simulation of an arcuate scale of a conventional analog meter.

17. The video meter as defined in claim 1 wherein the visual elements in at least the picture region of said display panel are organized in a plurality of substantially parallel rows, and each row is made to represent a different picture parameter, selected from a group including individual primary color chrominance levels.

18. The video meter as defined in claim 1 further comprising one or more visual status indicators disposed in said panel, said processing circuitry being adapted to particularly monitor one or more designated parameters of the video signal and to indicate designated status condition events by actuation of a corresponding visual indicator.

19. The video meter as defined in claim 18 wherein said processing circuitry is adapted to provide status indication in response to corresponding events having a time duration exceeding a specified minimum value, and to cause a lengthening of display time so as to allow human response to short term events.

20. The video meter as defined in claim 1 further comprising:
a second video input coaxial cable receptacle connected to said video input coaxial cable receptacle, and
a switchable termination resistor associated with said video input coaxial cable receptacle.

* * * * *